US010299567B2

United States Patent
Usher et al.

(10) Patent No.: US 10,299,567 B2
(45) Date of Patent: May 28, 2019

(54) MIRROR WITH ZONE OF SELECTED MAGNIFICATION AND DISCRETIONARY ILLUMINATION

(71) Applicants: Scott D. Usher, Teaneck, NJ (US); Daniel Deutsch, New York, NY (US)

(72) Inventors: Scott D. Usher, Teaneck, NJ (US); Daniel Deutsch, New York, NY (US)

( * ) Notice: Subject to any disclaimer, the term of this patent is extended or adjusted under 35 U.S.C. 154(b) by 180 days.

(21) Appl. No.: 15/064,691

(22) Filed: Mar. 9, 2016

(65) Prior Publication Data
US 2017/0258206 A1   Sep. 14, 2017

(51) Int. Cl.
| | | |
|---|---|---|
| *A45D 42/24* | (2006.01) | |
| *G02B 27/02* | (2006.01) | |
| *G02B 26/08* | (2006.01) | |
| *A45D 42/10* | (2006.01) | |
| *G02B 5/09* | (2006.01) | |

(52) U.S. Cl.
CPC ............ *A45D 42/24* (2013.01); *A45D 42/10* (2013.01); *G02B 5/09* (2013.01); *G02B 26/0825* (2013.01); *G02B 27/027* (2013.01)

(58) Field of Classification Search
CPC .. G02B 27/02; G02B 27/027; G02B 17/0668; G02B 26/0825; G02B 26/08; G02B 26/06; G02B 5/08; G02B 5/09; B60R 1/12; B60R 1/081; B60R 1/082; B60R 1/10; A45D 42/24; A45D 42/10
USPC ....... 359/846, 838, 849, 850, 854, 855, 858, 359/862, 864, 865, 875
See application file for complete search history.

(56) References Cited

U.S. PATENT DOCUMENTS

| | | |
|---|---|---|
| 3,004,472 A | 7/1958 | Buxton |
| 3,610,738 A | 10/1971 | Bochmann |
| 3,623,793 A | 11/1971 | Merten |
| 3,832,039 A | 8/1974 | Doolittle |
| 3,972,600 A | 8/1976 | Cobarg |
| 4,119,366 A | 10/1978 | Lemaitre |
| 4,530,571 A | 7/1985 | Connor |
| 4,601,553 A | 7/1986 | Pepi et al. |
| 5,016,998 A | 5/1991 | Butler et al. |
| 5,109,300 A | 4/1992 | Waddell |
| 5,204,784 A | 4/1993 | Spinhime |
| 5,900,996 A | 5/1999 | Zadro |

(Continued)

FOREIGN PATENT DOCUMENTS

| | | |
|---|---|---|
| CN | 2164713 Y | 5/1994 |
| CN | 205053175 U | 3/2016 |

(Continued)

OTHER PUBLICATIONS

English translation of CN 205053175, machine translated on Oct. 18, 2017.*

*Primary Examiner* — Jie Lei (74) *Attorney, Agent, or Firm* — Arthur Jacob (57) ABSTRACT

A method and a mirror selectively magnify an image reflected by a discrete portion of a reflective area of the mirror while an image reflected by the remainder of the reflective area outside the discrete portion remains unchanged. A light-transmitting area is placed within the reflective area, outside of and adjacent to the discrete portion, and a light source is located for directing light through the light-transmitting area to illuminate a space adjacent to and confronting at least the discrete portion of the reflective area.

19 Claims, 5 Drawing Sheets

(56) References Cited

U.S. PATENT DOCUMENTS

| | | |
|---|---|---|
| 6,238,052 B1 | 5/2001 | Zadro |
| 6,332,687 B1 | 12/2001 | Carreras et al. |
| 6,758,569 B2 | 7/2004 | Creek |
| 7,874,688 B2 | 1/2011 | Aoki et al. |
| 2012/0087027 A1 | 4/2012 | Okayasu |

FOREIGN PATENT DOCUMENTS

| | | | |
|---|---|---|---|
| JP | 2014119626 A | 6/2014 | |
| NL | 8601207 A | 12/1987 | |
| SU | 1777797 A | 11/1992 | |

* cited by examiner

FIG. 14 though the invention, with still further objects and advantages will become apparent, in the following detailed description of preferred embodiments of the invention illustrated in the accompanying drawing, in which:

MIRROR WITH ZONE OF SELECTED MAGNIFICATION AND DISCRETIONARY ILLUMINATION

The present invention relates generally to mirrors and pertains, more specifically, to mirrors placed in installations for personal use in dressing and grooming where a mirror is required to assist in completing a variety of such functions.

A wide variety of mirrors have been developed over a very long time to serve numerous personal functions, especially in assisting an individual in dressing and grooming where it has become almost essential that a person view oneself in various degrees of detail. For example, during the application of cosmetics or during shaving, as well as in other grooming procedures, it is essential that a person be able to view facial and immediately surrounding features in great detail; and during dressing there is a need for a mirror that provides a more natural overall view. These requirements usually lead to the use of separate mirrors; perhaps a smaller mirror for providing a magnified image to facilitate the former functions, and a larger, flat mirror for accomplishing the latter functions. Moreover, in certain venues such as, for example, in hotels, motels, resort lodgings and the like, as well as in the home, it would be most convenient, and indeed practical, to have a mirror installation that could serve all of the aforesaid functions in a single, compact construction, easily operated to accomplish all of these objectives.

The present invention provides a mirror for serving the above purposes. As such, the present invention attains several objects and advantages, some of which are summarized as follows: Makes available a relatively simple mirror construction that provides both an overall, unaltered reflected image as well as a selectively magnified portion of the overall image, in a single installation; provides a mirror construction having, in a single installation, an overall reflective area furnishing an unmodified reflected image and an integrated zone within the overall reflective area providing a magnified image of selected magnification, together with a lighting arrangement for providing illumination adjacent the magnified image; enables a conveniently and easily operated selectively magnified zone of a mirror, surrounded by a mirrored area of unaltered reflectivity for a compact and versatile mirror installation; establishes a complete, easily installed and readily maintained mirror arrangement for practical use in a wide variety of venues; provides a reliable mirror system economically manufactured and readily installed for effective, long-term service.

The above objects and advantages, as well as further objects and advantages, are attained by the present invention which may be described briefly as a mirror having a reflective area, a discrete portion of which reflective area enables the reflection of an image selectively magnified relative to an image reflected by the remainder of the reflective area outside the discrete portion, the mirror comprising: an overall reflective area having a given contour configuration; at least one discrete reflective zone within the overall reflective area, the discrete reflective zone being selectively displaced out of the given contour configuration to effect reconfiguring of the discrete reflective zone relative to the given contour configuration followed by the remainder of the overall reflective area, by a displacement between a first position, wherein the discrete reflective zone follows the given contour configuration, and a second position, wherein the discrete reflective zone follows a concave configuration, relative to the given contour configuration followed by the overall reflective area; and an actuating mechanism coupled with the discrete reflective zone for selective operation to displace the discrete reflective zone between the first and second positions, whereby the remainder of the overall reflective area provides an unchanged reflected image while the discrete reflective zone provides a selectively variable image magnified relative to the unchanged reflected image.

In addition, the present invention provides a method for selectively magnifying an image reflected by a discrete portion of a reflective area of a mirror, while an image reflected by the remainder of the reflective area outside the discrete portion remains unchanged, the method comprising: providing the mirror with an overall reflective area having a given contour configuration; selectively displacing at least one discrete reflective zone within the overall reflective area out of the given contour configuration to effect reconfiguring of the discrete reflective zone relative to the given contour configuration followed by the remainder of the overall reflective area, by a displacement between a first position, wherein the discrete reflective zone follows the given contour configuration, and a second position, wherein the discrete reflective zone follows a concave configuration, relative to the given contour configuration followed by the remainder of the overall reflective area; and coupling an actuating mechanism with the discrete reflective zone for selective operation to displace the discrete reflective zone between the first and second positions, whereby the given contour configuration of the remainder of the overall reflective area provides an unchanged reflected image while the discrete reflective zone provides a selectively variable image magnified relative to the unchanged reflected image.

The present invention will be understood more fully, while still further objects and advantages will become apparent, in the following detailed description of preferred embodiments of the invention illustrated in the accompanying drawing, in which.

Referring now to the drawing, and especially to FIGS. 1 through 6 thereof, mirrors 20 constructed in accordance with the present invention are shown in a circular version at 22 and in a rectangular version at 24. Each mirror 20 includes a reflective area 30 having an overall reflective area 32 within which overall reflective area 32 there is located a discrete portion, shown in the form of a discrete reflective zone 34. The overall reflective area 32 has a given contour configuration which, in the illustrated preferred embodiments, is a flat, essentially planar configuration. When in the flat configuration, the overall reflective area 32 provides a true, unmodified reflected image (not shown) throughout the entire reflective area 30, in the manner of a conventional mirror. However, where there is a requirement for a more detailed reflected image, such as when applying cosmetics or during the conduct of a shaving operation, each mirror 20 includes an arrangement by which a discrete portion of the reflective area 30 is selectively reconfigured to provide an image that is magnified relative to the image reflected by the ordinarily flat configuration of the reflective area 30, thereby enabling a user to observe a magnified localized image while still retaining an adjacent contrasting unchanged image for a convenient simultaneous comparison between the magnified image and the unchanged image.

To that end, reflective area 30 is located on a resiliently flexible member, shown in the form of a membrane 40 supported upon a relatively rigid substrate 42, the membrane 40 having an obverse, front face 44 along which the reflective area 30 extends, and a reverse, rear face 46 juxtaposed with the substrate 42, preferably affixed to the substrate 42, outside the discrete reflective zone 34. An actuating mechanism includes a chamber 50 associated with the substrate 42 and juxtaposed with a portion 52 of the membrane 40 corresponding to the area of the membrane 40 occupied by the discrete reflective zone 34, at the reverse, rear face 46 of the membrane 40. The chamber 50 includes a chamber wall 56 having a concave, semi-spherical configuration, and a vacuum system 60 includes a vacuum source in the form of a vacuum pump 62 connected to chamber 50 at a port 64 in the chamber wall 56 by means of a conduit 66. A controller 70 controls the selective operation of vacuum pump 62 for controlling air pressure within chamber 50 for selectively drawing the corresponding portion 52 of the membrane 40 into chamber 50 to displace the corresponding portion 52 from a first position, illustrated in FIG. 3, wherein the discrete reflective zone 34 follows the flat, essentially planar given contour configuration, to a second position, illustrated in FIG. 4, wherein the discrete reflective zone 34 follows the concave, semi-spherical configuration of the chamber wall 56. In this manner, the discrete reflective zone 34 provides a magnified image of selected magnification within a range established between the first and second positions, while the remainder 72 of the overall reflective area 32 continues to provide an unchanged reflected image. In order to facilitate the selective magnification, without the introduction of unwanted distortion in the magnified image, as well as to provide the user with a convenient relative location of the magnified and unchanged images, the discrete reflective zone 34 advantageously is completely surrounded by the remainder 72 of the overall reflective area 32.

In the preferred embodiments, a light source is integrated with each mirror 20 for illuminating the user of the mirror 20, and especially portions of the user reflected by the discrete reflective zone 34. Thus, each mirror 20 is provided with a light-transmitting zone, shown in the form of a light-transmitting area 80 placed in the remainder 72 of the overall reflective area 32. In the preferred construction, membrane 40 is constructed of a light-transmitting material, such as a substantially transparent synthetic polymeric material, with a light-reflective coating 82 providing the reflective area 30. Portions of the coating 82 are deleted to establish light-transmitting area 80, and a light source, shown in the form of LEDs 84, is located behind membrane 40 to direct light through the light-transmitting area 80 to illuminate a space 86 adjacent to and confronting at least the discrete reflective zone 34. A power supply 88 supplies the power necessary to operate the LEDs 84.

In the embodiments illustrated in FIGS. 1 through 6, substrate 42 is constructed of a substantially transparent synthetic polymeric material, such as a clear acrylic plastic, and LEDs 84 are placed in a slot 90 within the substrate 42 to couple LEDs 84 with the transparent material of substrate 42 such that light from the LEDs 84 is conducted through the material of substrate 42 to be distributed to the rear face 46 of membrane 40, behind the light-transmitting area 80, the light-transmitting area 80 preferably completely surrounds the discrete reflective zone 34 and creates an aesthetically pleasing luminous halo effect within the light-transmitting area 80. This halo effect is further enhanced by diffusing the light passing through the membrane 40 at the light-transmitting area 80, as by creating a sandblasted finish along reflective area 30, within light-transmitting area 80. Cleats 100 are affixed to substrate 42 to assist in mounting a mirror 20 upon a desired support structure (not shown).

Figure 1:
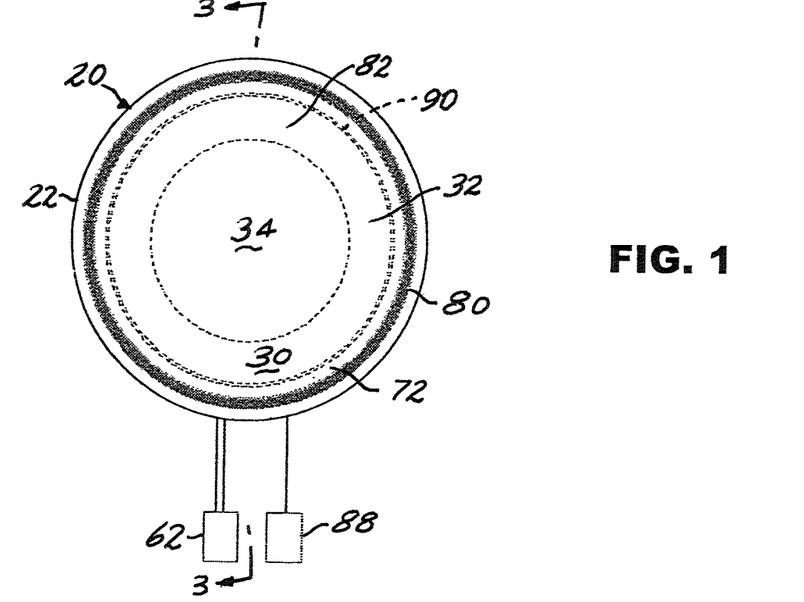
FIG. 1 is a partially diagrammatic front elevational view of a mirror constructed in accordance with the present invention.
Figure 2:
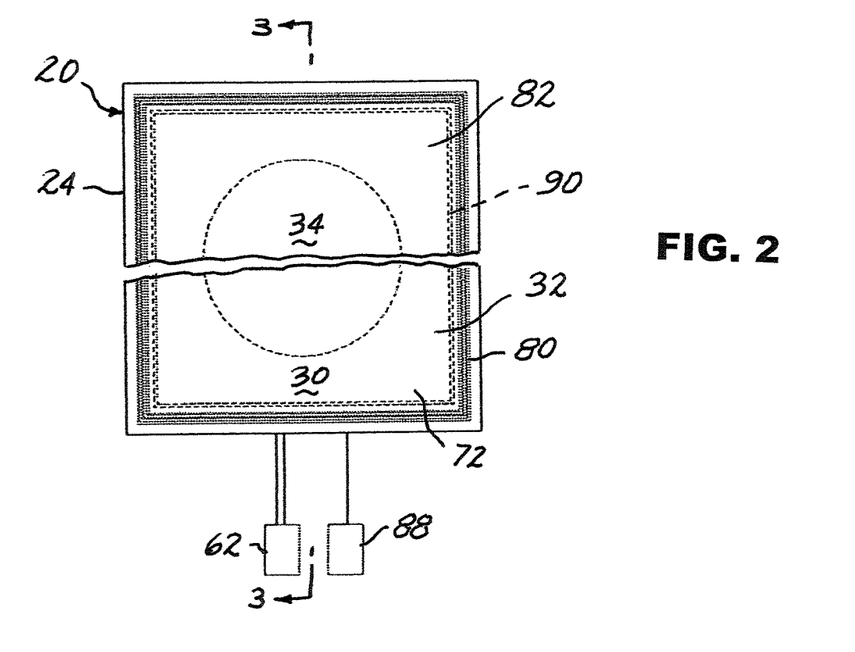
FIG. 2 is a partially diagrammatic front elevational view of another mirror constructed in accordance with the present invention.
Figure 3:
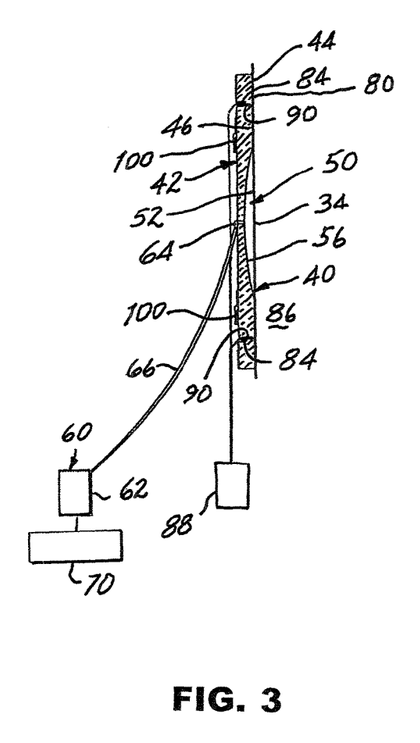
FIG. 3 is a partially diagrammatic cross-sectional view taken along line 3-3 in either FIG. 1 or FIG. 2.
Figure 4:
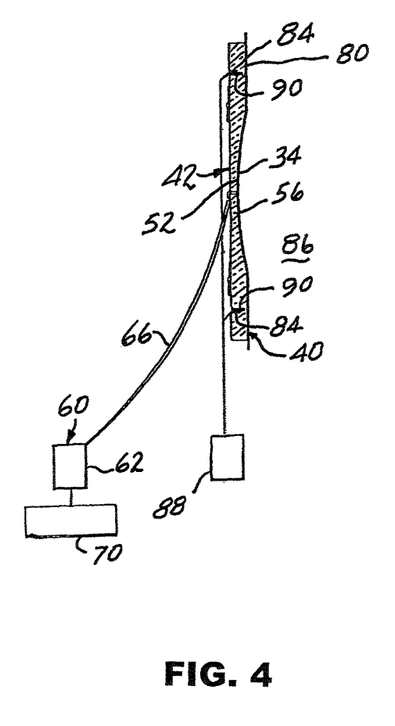
FIG. 4 is a cross-sectional view similar to FIG. 3 and showing component parts in another operational position.
Figure 5:
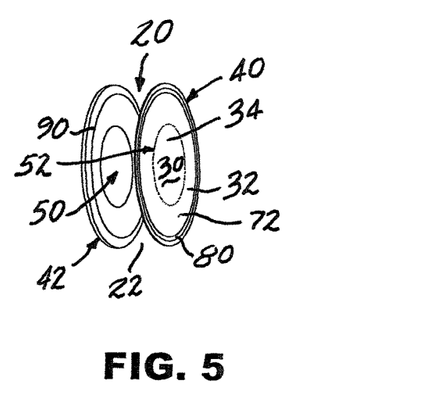
FIG. 5 is an exploded pictorial view illustrating component parts of a mirror similar to that of FIG. 1.
Figure 6:
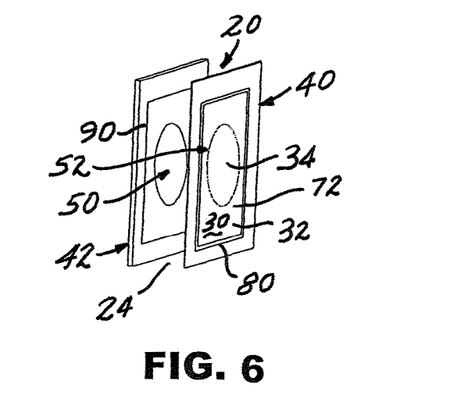
FIG. 6 is an exploded pictorial view illustrating component parts of a mirror similar to that of FIG. 2.
Figure 7:
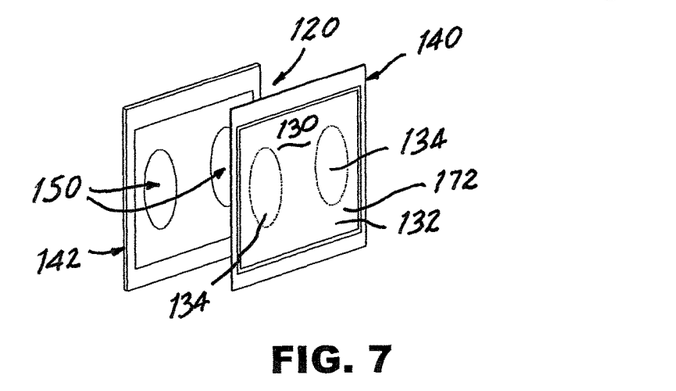
FIG. 7 is an exploded pictorial view showing component parts of another mirror constructed in accordance with the present invention.

The embodiment illustrated in FIG. 7 is constructed similar to those illustrated in FIGS. 1 through 6 in that a mirror 120 includes a reflective area 130 having an overall reflective area 132. However, in the present embodiment, there is located more than one discrete portion, here shown in the form of two discrete reflective zones 134, each surrounded completely by the remainder 172 of the overall reflective area 132. The overall reflective area 132 has a given contour configuration which, as in the embodiments described above, is a flat, essentially planar configuration. When in the flat configuration, the overall reflective area 132 can provide more than one user (not shown) with a reflected image (not shown) within the entire reflective area 130, in the manner of a conventional mirror. However, where there is a requirement for a more detailed reflected image, mirror 120 includes an arrangement having two independently controlled and operated vacuum chambers 150 within a substrate 142 placed behind a resiliently flexible membrane 140, allowing each discrete portion of the reflective area 130 to be selectively reconfigured for providing an image that is magnified relative to the image reflected by the ordinarily flat configuration of the surrounding remainder 172 of the reflective area 130, thereby enabling users to observe magnified localized images while still retaining adjacent contrasting unchanged images for a convenient simultaneous comparison between the magnified images and the unchanged images, all as described more fully in connection with the embodiments illustrated in FIGS. 1 through 6.

Figure 8:
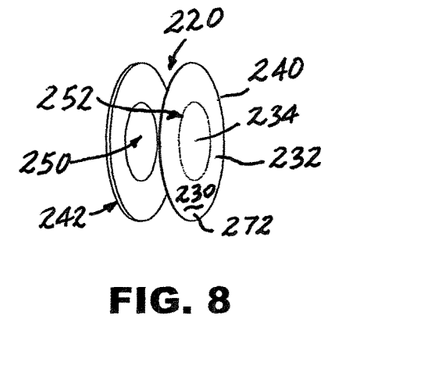
FIG. 8 is an exploded pictorial view showing component parts of a modified version of the mirror of FIG. 1.
Figure 9:
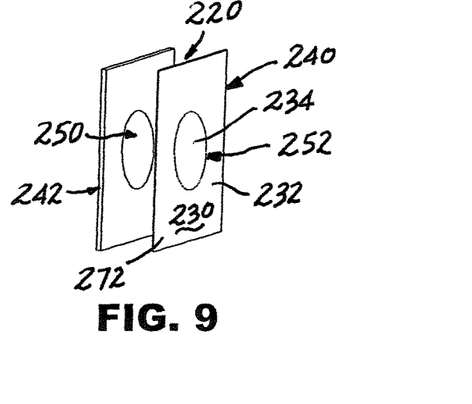
FIG. 9 is an exploded pictorial view showing component parts of a modified version of the mirror of FIG. 2.

With reference to FIGS. 8 and 9, mirrors 220 are constructed similar to mirrors 20 in that each mirror 220 includes a reflective area 230 having an overall reflective area 232 within which overall reflective area 232 there is located a discrete portion, shown in the form of a discrete reflective zone 234 completely surrounded by the remainder 272 of the overall reflective area 232. The overall reflective area 232 has a given contour configuration which, in the illustrated embodiments, is a flat, essentially planar configuration. When in the flat configuration, the overall reflective area 232 provides a reflected image (not shown) throughout the entire reflective area 230, in the manner of a conventional mirror. However, where there is a requirement for a more detailed reflected image, each mirror 220 includes an arrangement having a vacuum chamber 250 within a substrate 242 placed behind a resilient flexible membrane 240, by which a discrete portion of the reflective area 230 is selectively reconfigured to provide an image that is magnified relative to the image reflected by the ordinarily flat configuration of the surrounding reflective area 230, thereby enabling the observation of a magnified localized image while still retaining an adjacent contrasting unchanged image for a convenient simultaneous comparison between the magnified image and the unchanged image.

To that end, reflective area 230 is located on the resiliently flexible member, shown in the form of the membrane 240 supported upon substrate 242 which is relatively rigid. The membrane 240 is affixed to the substrate 242, outside the discrete reflective zone 234. A chamber 250 is associated with the substrate 242 and is registered with a portion 252 of the membrane 240 corresponding to the area of the membrane 240 occupied by the discrete reflective zone 234. As described above in connection with the embodiments illustrated in FIGS. 1 through 6, chamber 250 has a concave, semi-spherical configuration, and an actuating system selectively draws the corresponding portion 252 of the membrane 240 into chamber 250 to displace the corresponding portion 252 over a range of displacement from a first position, wherein the discrete reflective zone 234 follows the flat, essentially planar given contour configuration, to a second position, wherein the discrete reflective zone 234 follows a concave, semi-spherical configuration. In this manner, the discrete reflective zone 234 provides a selectively variable magnified image over a range of magnification, while the remainder 272 of the overall reflective area 232 continues to provide an unchanged reflected image.

Figure 10:
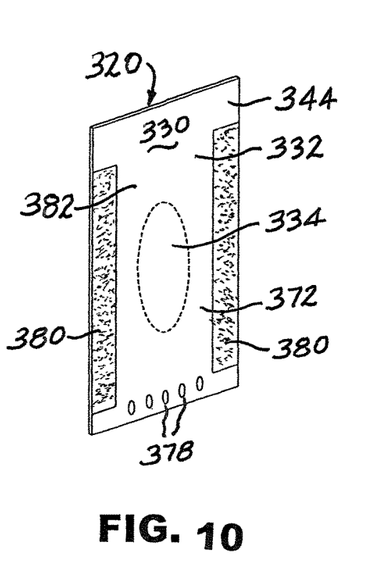
FIG. 10 is a top, side and front pictorial view showing still another mirror constructed in accordance with the present invention.
Figure 11:
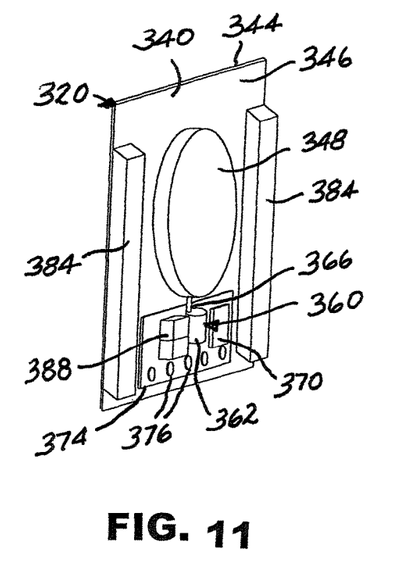
FIG. 11 is a top, side and rear pictorial view of the mirror of FIG. 10.
Figure 12:
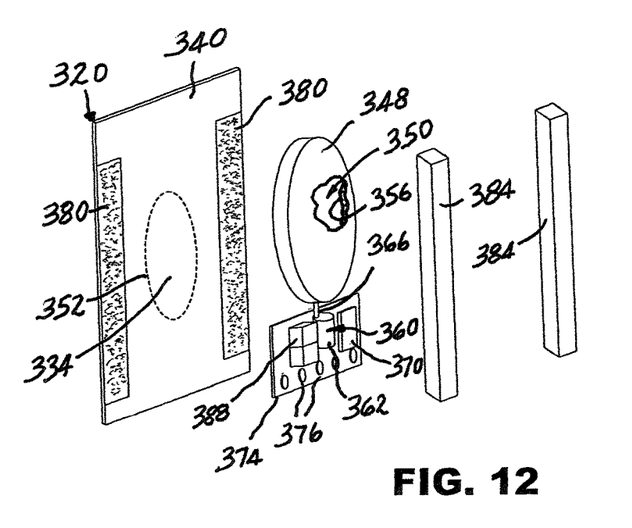
FIG. 12 is an exploded pictorial view showing component parts of the mirror illustrated in FIG. 11.
Figure 14:
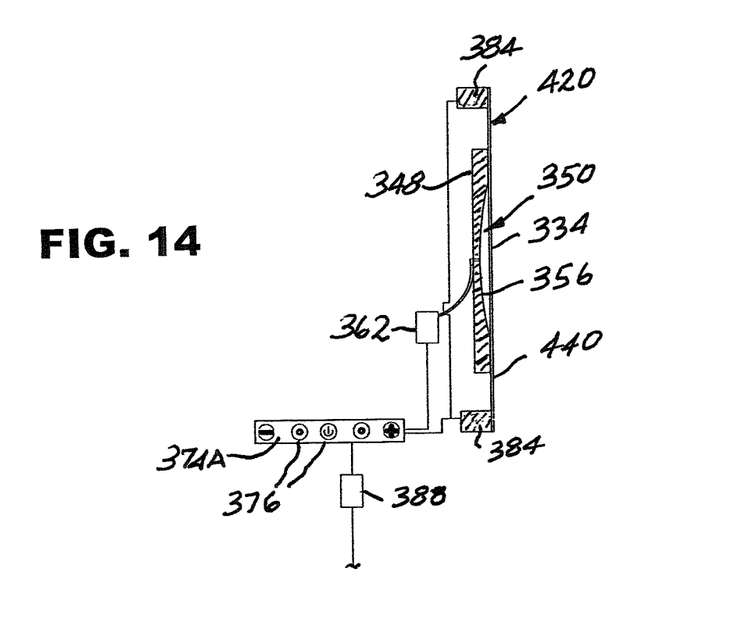
FIG. 14 is a partially diagrammatic cross-sectional view taken along line 14-14 of FIG. 13.

Turning now to FIGS. 10 through 12, and with reference to FIG. 14, another mirror constructed in accordance with the present invention is shown in the form of mirror 320. Mirror 320 includes a reflective area 330 having an overall reflective area 332 within which overall reflective area 332 there is located a discrete portion, shown in the form of a discrete reflective zone 334 completely surrounded by the remainder 372 of the overall reflective area 332. The overall reflective area 332 has a given contour configuration which, in the illustrated preferred embodiment, is a flat, essentially planar configuration. When in the flat configuration, the overall reflective area 332 provides a reflected image (not shown) throughout the entire reflective area 330, in the manner of a conventional mirror. However, where there is a requirement for a more detailed reflected image, mirror 320 includes an arrangement having a vacuum chamber 350 by which a discrete portion of the reflective area 330 is selectively reconfigured to provide an image that is magnified relative to the image reflected by the ordinarily flat configuration of the reflective area 330, thereby enabling a user to observe a magnified localized image while still retaining an adjacent contrasting unchanged image for a convenient simultaneous comparison between the magnified image and the unchanged image.

Reflective area 330 is located on a resiliently flexible member shown in the form of a plate 340 having an obverse, front face 344 along which the reflective area 330 extends, and a reverse, rear face 346. An actuating mechanism includes a chamber member 348 affixed to the rear face 346 of plate 340 and having a chamber 350 therein, located in registration with the discrete reflective zone 334, juxtaposed with a portion 352 of the plate 340 corresponding to the area of the plate 340 occupied by the discrete reflective zone 334, at the reverse, rear face 346 of the plate 340. The chamber 350 includes a chamber wall 356 having a concave, semi-spherical configuration, and a vacuum system 360 includes a vacuum source in the form of a vacuum pump 362 connected to chamber 350 by means of a conduit 366. A controller 370 controls the selective operation of vacuum pump 362 for controlling air pressure within chamber 350 for selectively drawing the corresponding portion 352 of the plate 340 into chamber 350 to displace the corresponding portion 352 in the manner described above in connection with the embodiments illustrated in FIGS. 1 through 6, that is, from a first position wherein the discrete reflective zone 334 follows the flat, essentially planar given contour configuration, to a second position wherein the discrete reflective zone 334 follows the concave, semi-spherical configuration of the chamber wall 356. In this manner, the discrete reflective zone 334 provides a magnified image, variable throughout a range of selected magnification made available between the first and second positions of portion 352, while the remainder 372 of the overall reflective area 332 continues to provide an unchanged reflected image. In a preferred construction, the vacuum pump 362 and the controller 370 are mounted upon a control board 374 which, in turn, is mounted upon the rear face 346 of plate 340, below chamber member 348, the plate 340 having a sufficient degree of rigidity to support the components mounted thereon, while still providing the resilient flexibility to enable movement of portion 352 between the first and second positions, as described above. At the same time, a plurality of electrical switches, shown in the form of electronic switches 376, are registered with switch positions 378 appearing at the front face 344 of plate 340 to enable a user to actuate certain of the switches 376 for controlling the operation of mirror 320 directly from the front of the mirror 320.

Light sources are integrated with mirror 320 for illuminating the user of the mirror 320, and especially portions of the user reflected by the discrete reflective zone 334. Thus, mirror 320 is provided with light-transmitting zones, shown in the form of light-transmitting areas 380 placed in the remainder 372 of the overall reflective area 332. In the preferred construction, plate 340 is constructed of a light-transmitting material, such as a substantially transparent synthetic polymeric material, with a light-reflective coating 382 providing the reflective area 330. Portions of the coating 382 are deleted to establish light-transmitting areas 380, and a light source, shown in the form of LED-bearing light fixtures 384, are located at the rear face 346 of plate 340 to direct light through the light-transmitting areas 380. A power supply 388 supplies the power necessary to operate the light fixtures 384 and the lighting is controlled by certain of the electronic switches 376.

Figure 13:
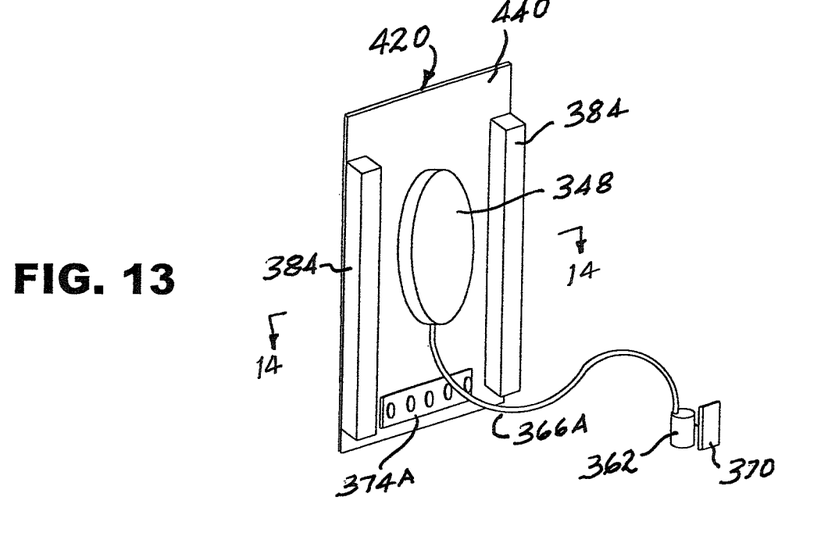
FIG. 13 is a top, side and rear pictorial view of another mirror constructed in accordance with the present invention.

In the mirror 420 illustrated in FIGS. 13 and 14, certain component parts are the same as those described above in connection with mirror 320, and operate in the same manner as described above. Those same component parts have been identified with the same reference characters as found in FIGS. 10 through 12. However, some of the component parts shown integrated with plate 340 of mirror 320 have been located remote from plate 440 of mirror 420. Thus, vacuum pump 362 has been removed to a remote location, and conduit 366 has been replaced with conduit 366A. The arrangement enables increased versatility in accomplishing installation of a mirror 420. Control board 374 has been replaced by a control board 374A which carries the plurality of electronic switches 376, enabling a user to operate mirror 420 in the same manner as in the operation of mirror 320.

It will be seen that the present invention attains all of the objects and advantages summarized above, namely: Makes available a relatively simple mirror construction that provides both an overall, unaltered reflected image as well as a selectively magnified portion of the overall image, in a single installation; provides a mirror construction having, in a single installation, an overall reflective area furnishing an unmodified reflected image and an integrated zone within the overall reflective area providing a magnified image of selected magnification, together with a lighting arrangement for providing illumination adjacent the magnified image; enables a conveniently and easily operated selectively magnified zone of a mirror, surrounded by a mirrored area of unaltered reflectivity for a compact and versatile mirror installation; establishes a complete, easily installed and readily maintained mirror arrangement for practical use in a wide variety of venues; provides a reliable mirror system economically manufactured and readily installed for effective, long-term service.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. A mirror having a construction providing both an overall, unaltered reflected image and a selectively magnified portion of the overall unaltered reflected image in a single installation, the mirror comprising:
   a single visible overall reflective area having a given contour configuration;
   at least one discrete reflective portion of the overall reflective area integrated within the single visible overall reflective area, the discrete reflective portion being selectively reconfigured relative to the given contour configuration of a remainder of the single overall reflective area located outside the discrete reflective portion to effect reconfiguring of the discrete reflective portion between a first configuration, wherein the discrete reflective portion follows the given contour configuration, and a second configuration, wherein the discrete reflective portion follows a concave configuration, relative to the given contour configuration followed by the remainder of the overall reflective area; and
   an actuating mechanism coupled with the discrete reflective portion for selective operation to reconfigure the discrete reflective portion between the first and second configurations, whereby the remainder of the overall reflective area provides an unchanged reflected image while the discrete reflective portion provides a selectively variable image magnified relative to the unchanged reflected image, with both the unchanged reflected image and the selectively variable image integrated within the single installation.

2. The mirror of claim 1 wherein the given contour configuration is essentially planar, and the discrete reflective portion is essentially planar when in the first configuration and is semi-spherical when in the second configuration.

3. The mirror of claim 1 wherein the discrete reflective portion is surrounded completely by the remainder of the overall reflective area.

4. The mirror of claim 3 wherein the given contour configuration is essentially planar, and the discrete reflective portion is essentially planar when in the first configuration and is semi-spherical when in the second configuration.

5. The mirror of claim 1 including a light-transmitting area within the remainder of the overall reflective area, and a light source located for directing light through the light-transmitting area to illuminate a space adjacent to and confronting at least the discrete reflective portion.

6. The mirror of claim 5 wherein the given contour configuration is essentially planar, and the discrete reflective portion is essentially planar when in the first configuration and is semi-spherical when in the second configuration.

7. The mirror of claim 6 wherein the discrete reflective portion is surrounded completely by the remainder of the overall reflective area.

8. The mirror of claim 1 wherein:
   the overall reflective area extends along a resiliently flexible member having a front face and a rear face, with the overall reflective area extending along the front face;
   the discrete reflective portion extends along a corresponding portion of the resiliently flexible member;
   a relatively rigid substrate is juxtaposed with the rear face of the resiliently flexible member, outside the corresponding portion of the of the resiliently flexible member occupied by the discrete reflective portion;
   the actuating mechanism includes a chamber juxtaposed with the corresponding portion of the of the resiliently flexible member occupied by the discrete reflective portion at the rear face of the resiliently flexible member; and
   a vacuum system for controlling pressure within the chamber is arranged for selectively drawing the corresponding portion of the resiliently flexible member into the chamber to reconfigure the corresponding portion of the resiliently flexible member from the first configuration of the discrete reflective portion into the second configuration thereof, and for selectively releasing the corresponding portion of the resiliently flexible member to return to the first configuration.

9. The mirror of claim 8 wherein the given contour configuration is essentially planar, and the discrete reflective portion is essentially planar when in the first configuration and is semi-spherical when in the second configuration.

10. The mirror of claim 8 wherein the discrete reflective portion is surrounded completely by the remainder of the overall reflective area.

11. The mirror of claim 10 wherein the given contour configuration is essentially planar, and the discrete reflective portion is essentially planar when in the first configuration and is semi-spherical when in the second configuration.

12. The mirror of claim 8 including a light-transmitting area within the remainder of the overall reflective area, and a light source located for directing light through the light-transmitting area to illuminate a space adjacent to and confronting at least the discrete reflective portion.

13. The mirror of claim 12 wherein the substrate includes a light-transmitting material juxtaposed with the light-transmitting area, and the light source is located for directing light to the substrate for transmitting light through the light-transmitting area.

14. The mirror of claim 13 wherein the light source is comprised of at least one LED.

15. The mirror of claim 14 wherein the substrate is comprised of a light-transmitting synthetic polymeric material and the at least one LED is coupled with the substrate to distribute light from the LED through the light-transmitting area.

16. The mirror of claim 15 wherein the discrete reflective portion is surrounded completely by the remainder of the overall reflective area such that light from the light source is distributed completely around the discrete reflective portion.

17. The mirror of claim 16 wherein the given contour configuration is essentially planar, and the discrete reflective portion is essentially planar when in the first configuration and is semi-spherical when in the second configuration.

18. A method for selectively magnifying an image reflected by a discrete reflective portion of a single overall unaltered reflective area of a mirror having a construction providing both an overall unaltered reflected image and a selectively magnified portion of the overall unaltered reflected image in a single installation, while an image reflected by a remainder of the single overall unaltered reflective area outside the discrete reflective portion remains unchanged, the method comprising:

providing the single overall unaltered reflective area with a given contour configuration;

selectively reconfiguring the discrete reflective portion out of the given contour configuration to reconfigure the discrete reflective portion relative to the given contour configuration followed by the remainder of the overall unaltered reflective area, between a first configuration, wherein the discrete reflective portion follows the given contour configuration, and a second configuration, wherein the discrete reflective portion follows a concave configuration, relative to the given contour configuration followed by the remainder of the overall unaltered reflective area; and coupling an actuating mechanism with the discrete reflective portion for selective operation to reconfigure the discrete reflective portion between the first and second configurations, whereby the given contour configuration of the remainder of the overall unaltered reflective area provides an unchanged reflected image while the discrete reflective portion provides a selectively variable image magnified relative to the unchanged reflected image.

19. The method of claim 18 including placing a light-transmitting area within the overall reflective area, outside of and adjacent to the discrete reflective portion, and locating a light source for directing light through the light-transmitting area to illuminate a space adjacent to and confronting at least the discrete reflective portion.

* * * * *